United States Patent Office 3,012,008
Patented Dec. 5, 1961

3,012,008
POLYISOCYANATE COMPOSITIONS
Arnold Lister, Manchester, England, assignor to Imperial Chemical Industries Limited, London, England, a corporation of Great Britain
No Drawing. Filed Mar. 28, 1958, Ser. No. 724,513
Claims priority, application Great Britain Nov. 1, 1957
5 Claims. (Cl. 260—75)

This invention relates to polyisocyanate compositions and more particularly to liquid polyisocyanate compositions especially useful for the manufacture of polyurethanes.

In the manufacture of polyurethanes from high molecular weight polyhydroxy compounds and polyisocyanates for use in lacquers, adhesives, plastic masses and the like a variety of polyisocyanates have been proposed but they have suffered from disadvantages such as toxicity, high melting point, low reactivity or discolouration of the reaction product.

Polyisocyanate compositions in respect of which these disadvantages are obviated or minimised can readily be prepared by phosgenating the mixed condensation products obtained from formaldehyde and mixtures of aromatic amines.

The processes used in the manufacture of the liquid polyisocyanate compositions are performed in the general manner described in the prior art or used commercially hitherto for the condensation of aromatic amines such as aniline with formaldehyde followed by phosgenation for example the phosgenation of 4:4'-diaminodiphenylmethane to 4:4'-diisocyanatodiphenylmethane; in order to obtain polyisocyanate compositions that are liquid at normal temperatures it is necessary only to use as starting materials suitable mixtures of at least two aromatic amines.

As examples of aromatic amines for use in the manufacture of the polyisocyanate compositions, there may be mentioned aniline, o- and m-substituted anilines such as toluidines and alkyl anilines, chloroanilines, anisidines and nitroanilines, m-phenylene diamine and substituted m-phenylenediamines such as m-toluylene diamine and chlor-m-phenylene diamine.

The proportion of total amines to be reacted with formaldehyde is desirably large since by the use of substantially more than the theoretical requirement of two molecular proportions of amine to one molecular proportion of formaldehyde the undesirable production of polynuclear amines having more than two nuclei is minimised. A preferred amount of total amines is from 4 to 5 molecular proportions per molecular proportion of formaldehyde. Even larger amounts can be used but then economic and operating disadvantages begin to predominate.

The proportions of amines in the mixture thereof is chosen so as to give a polyisocyanate composition of the desired low melting point and this choice is most conveniently made by trial. In general it is found that very valuable liquid polyisocyanate compositions are obtained when the proportions of amines are chosen so that of the total amines converted into polyisocyanates not more than 80% by molecular proportions consists of any single amine. It is in general not possible to achieve this condition merely by ensuring that not more than 80% of the amine mixture to be reacted with formaldehyde consists of any single amine, since the reactivity of amines towards formaldehyde varies widely. Thus, for example, using a total amines to formaldehyde molecular ratio of 4.4 to 1, a mixture of 9 molecular proportions of aniline and 1 molecular proportion of o-toluidine produces ultimately a distilled mixed diisocyanato diarylmethane in which the molecular proportions of reacted aniline and o-toluidine are about 3 to 1, whereas to produce a distilled mixed diisocyanato diarylmethane in which the proportions of reacted aniline and o-chloraniline are about 3 to 1, it is necessary to use a mixture of 0.56 molecular proportion of aniline and 1 molecular proportion of o-chloraniline.

It is to be understood that the liquid polyisocyanate may be made by phosgenating either distilled or crude polyamine compositions or their hydrohalides, e.g. their hydrochlorides. If a distilled polyisocyanate is desired, it is preferable to use a distilled polyamine.

When the liquid polyisocyanate compositions are modified with compounds containing a plurality of isocyanate-reactive groups, the so-modified compositions are especially valuable in the manufacture of polyurethanes in the form of coatings at ordinary temperatures, since the so-obtained polyurethane films are exceptionally free from cloudiness.

Thus according to the present invention the liquid polyisocyanate compositions obtained by phosgenating the polyamine compositions obtained by condensing formaldehyde with a mixture of at least two aromatic amines are reacted with less than the stoichiometric equivalent of at least one compound containing a plurality of isocyanate-reactive groups.

Suitable compounds containing a plurality of isocyanate-reactive groups include polyfunctional alcoholes, amines or hydroxyamines such as hexane triols, castor oil; triethanolamine, dietheylene glycol, butylene glycols, diethanolamine, N-methyl diethanolamine, polyesters, polyesteramides, polyethers; mixtures of such compounds may be used. An especially useful compound for the reaction is trimethylolpropane which gives a product having the desired technological properties over a considerable range of proportions.

The amount of polyfunctional compound may be varied widely; suitable proportions are such as to provide 0.05 to 0.5, preferably 0.2 to 0.3, isocyanate-reactive groups per isocyanate group. The smaller proportions yield a more fluid product whereas the higher proportions are useful where a greater degree of polyfunctionality is desirable.

The reaction of the liquid polyisocyanate composition with the polyfunctional compounds may be performed in the absence or presence of inert solvents or diluents such as ethyl or butyl acetate, acetone, methyl ethyl ketone, methyl isobutyl ketone, cyclohexanone, toluene or mixtures thereof.

Being liquid at ordinary temperatures, the modified polyisocyanate compositions are convenient to handle and are easily mixed with high molecular weight polyhydroxy compounds in the absence or presence of solvents. Due to their low volatility, they present a minimum toxic hazard in use.

The invention is illustrated but not limited by the following examples in which parts and percentages are by weight.

*Example 1*

189 parts 36% hydrochloric acid are added to a stirred mixture of 366 parts aniline, 420 parts o-toluidine and 36 parts water keeping the temperature below 60° C. After cooling to 0° C., 145 parts 37% formaldehyde solution are added dropwise at such a rate that the temperature does not exceed 5° C., the mixture being maintained at this temperature for a further 1½ hours. The product is then heated at 80° C. for 6 hours, basified with 32% sodium hydroxide, and the aqueous layer is separated. The diaminodiarylmethane mixture is isolated from the oily layer by distillation of water and substantially all unreacted monamines at 15–25 mm. pressure. The remaining crude product is fractionally distilled at a lower pressure, the desired diaminodiarylmethane mixture distilling at 185–230° C./0.2 mm. forming a cream-coloured solid (320 parts) on cooling.

250 parts of phosgene are dissolved in 750 parts o-dichlorobenzene at −5° C. to 0° C. with stirring. A solution of 316 parts of the above diaminodiarylmethane mixture in 1960 parts of o-dichlorobenzene at 120–130° C. is added to the well-stirred phosgene solution at such a rate that the temperature can be maintained below 10° C. The white suspension is allowed to regain atmospheric temperature during 16 hours with continued stirring. A slow stream of phosgene is passed through the mixture and the temperature is raised to about 60° C. in the course of about 1½ hours when hydrogen chloride is copiously evolved. A rapid stream of phosgene is then passed while the temperature is progressively raised to 165–170° C. during 2–3 hours and so maintained until the evolution of hydrogen chloride ceases. Nitrogen is then passed rapidly at 165–170° C. to remove dissolved phosgene and hydrogen chloride from the virtually clear solution which is then cooled and filtered from traces of insoluble matter and distilled at 15 mm. pressure to remove o-dichlorbenzene. The residual crude dissocyanate mixture is fractionally distilled at lower pressure, the desired diisocyanatodiarylmethane mixture boiling at 167–184/0.2 mm. (317 parts).

The distilled diisocyanate mixture, a pale yellow oil of setting point 0.5° C. has the NCO content 31.0%, which, assuming 100% purity, indicates that the mixture contains about 25% of the isocyanatophenyl and about 75% of the isocyanatotolyl moieties.

*Example 2*

293 parts aniline, 84 parts o-toluidine and 18 parts water are reacted as in Example 1, with 94.4 parts 36% hydrochloric acid and 72.4 parts 37% formaldehyde solution.

The desired diaminodiarymethane mixture (142 parts) is collected at 166–195/0.1 mm. and is converted to the corresponding diisocyanate mixture by the procedure of Example 1, the product distilling at 162–174/0.13 mm. The diisocyanatodiarylmethane mixture, of setting point −5° C., has the NCO content 32.2%, which, assuming 100% purity, indicates that the mixture contains about 60% of the isocyanatophenyl and about 40% of the isocyanatotolyl moieties.

*Example 3*

330 parts aniline, 803 parts o-chloraniline and 18 parts water are reacted as in Example 1, with 236 parts 36% hydrochloric acid and 181 parts 37% formaldehyde solution, the diaminodiarylmethane mixture (252 parts) being distilled at 169–210° C./0.1 mm.

The diaminodiarylmethane mixture (220 parts) is converted to the corresponding dissocyanate mixture by the procedure of Example 1, the desired product, 221 parts of a pale yellow oil, setting point 10° C., being distilled at 160–190° C./0.12 mm.

The NCO content of the diisocyanatodiarylmethane mixture is 31.6%, which, assuming 100% purity, indicates that the mixture contains about 75% of the isocyanatophenyl and about 25% of the isocyanatochlorophenyl moieties.

*Example 4*

549 parts aniline, 210 parts o-toluidine, 36 parts water, 189 parts 36% hydrochloric acid and 145 parts 37% formaldehyde solution are reacted as described in Example 1. After basification, separation of the aqueous layer and removal of substantially all unreacted monoamines by distillation at 15–25 mm. pressure, there remains a crude diaminodiarylmethane mixture. By fractional distillation at a lower pressure, the desired diaminodiarylmethane mixture (310 parts) distils at 216–222° C./3.5 mm., forming a cream coloured solid on cooling. It is converted to the corresponding diisocyanatodiarylmethane by the procedure of Example 1, the desired diisocyanatodiarylmethane mixture distilling at 195–200° C. at 5 mm. pressure and forming a pale yellow oil of setting point −10° C. and containing 32.15% NCO groups.

*Example 5*

100 parts of the distilled diaminodiarylmethane mixture described in Example 4 are purified by dissolving in 230 parts hot o-dichlorobenzene and allowing the solution to cool. 3-methyl-4:4′-diaminodiphenylmethane of melting point 128–129° C. which crystallises out is filtered and adherent solvent removed by drying at 80–90° C. The yield is about 75 parts.

63 parts 3-methyl-4:4′-diaminodiphenylmethane are added during 1½ hours to a stirred solution of 100 parts phosgene in 650 parts o-dichlorbenzene cooled to 0–5° C. throughout the addition. Thereafter the temperature is raised to 20° C. over 2 hours and the mixture is stirred thereat for 16 hours. While passing a rapid stream of phosgene the temperature is raised to 160–165° C. in about 3 hours, phosgenation being complete after a further 2 hours under these conditions. A rapid stream of dry nitrogen is passed through the refluxing solution to removed dissolved phosgene and hydrogen chloride, after which the clear solution is distilled at 15 mm. pressure to remove o-dichlorbenzene. On distillation of the residual product at lower pressure, 62 parts 4:4′-diisocyanato-3-methyldiphenylmethane, boiling at 169–179° C. at 0.45–0.65 mm. pressure, are obtained; the setting point is about −13° C. This compound is a novel diisocyanate that is liquid at room temperature and is easily prepared from readily available materials and accordingly is especially valuable for use in the manufacture of polyurethanes.

*Example 6*

A solution of 525 parts crude diaminodiarylmethane mixture made as described in Example 4 in 1600 parts o-dichlorbenzene at 90–100° C. is added over 2½ hours to a stirred solution of 650 parts phosgene in 850 parts o-dichlorbenzene at 0° C., the temperature being kept below 12° C. during the addition, after which the reaction mixture is stirred for 16 hours at 15–20° C. The temperature is then raised over 3½ hours to 70° C., when a stream of phosgene is passed through the mixture which is heated to 165–170° C. in 3 hours and these conditions are maintained for a further 3½ hours. Dissolved phosgene and hydrogen chloride are expelled from the refluxing solution by a rapid stream of dry nitrogen during 6 hours. The cold solution is filtered from a small amount of insoluble matter and o-dichlorbenzene is substantially removed by distillation at 15–20 mm. pressure, concentration being completed by raising the temperature to 165° C. and lowering the pressure to 7 mm. The liquid product (658 parts) so obtained contains 29.3% NCO groups.

*Example 7*

52.5 parts 36% hydrochloric acid are added to a stirred mixture of 140 parts aniline, 54 parts o-toluidine, 24 parts m-tolylenediamine and 10 parts water below 60° C. and, after cooling to 0° C., 40.5 parts 37% aqueous formaldehyde are introduced at below 5° C. and the mixture is further reacted as in Example 1. After removal of unreacted amines by distillation at 17 mm. pressure finally up to a bath temperature of 185° C., there remain 92 parts of a crude polyaminodiarylmethane mixture which solidifies on cooling.

A cold solution of 42 parts of this crude polyaminodiarylmethane mixture in 180 parts o-dichlorbenzene is added to a stirred solution of 60 parts phosgene in 160 parts o-dichlorbenzene between 5° C. and 25° C. and the mixture is stirred at about 20° C. for 18 hours. The temperature of the mixture is raised gradually to about 80° C. and a rapid stream of phosgene introduced while raising the temperature over 1½ hours to 165–170° C. After phosgenating at this temperature for a further 3 hours, a stream of dry nitrogen is passed for 5 hours. The cold solution is filtered from a little insoluble matter, solvent distilled off at 15–20 mm. pressure, finally to a bath temperature of 168° C. at a pressure of 2.5 mm. The resulting polyisocyanatodiarylmethane mixture (51 parts) is a brown viscous liquid at ordinary temperature containing 31.8% NCO groups.

Alternatively, 50 parts of the crude polyaminodiarylmethane mixture made as above is distilled at low pressure, the desired polyaminodiarylmethane mixture distilling at 190–230° C./0.25 mm. and forming a pale yellow solid (23.5 parts) on cooling. A solution of this polyamine (23.5 parts) in 160 parts o-dichlorbenzene at about 85° C. is added to a stirred solution of 40 parts phosgene in 100 parts o-dichlorbenzene at below 10° C. The temperature is raised to 20° C. in 1½ hours and to 85° C. during the next 1½ hours, when a stream of phosgene is passed through the mixture while raising the temperature to 165–170° C. over 1½ hours. Phosgenation is complete in a further 1 hour under these conditions and, after passing dry nitrogen into the refluxing solution for 7 hours, the cooled reaction mixture is filtered from a little insoluble matter and solvent is distilled off at 15–20 mm. pressure. The desired polyisocyanatodiarylmethane mixture (24 parts) is finally distilled at 160–187° C./0.25 mm. and is a pale yellow oil at ordinary temperatures containing 33.65% NCO groups.

Example 8

100 parts of distilled diisocyanatodiarylmethane mixture made as described in Example 4 are stirred, under conditions which exclude moisture, with about 2 parts sodium methoxide at 103–105° C. for 14 hours. The cold liquid product is filtered from catalyst and contains 26.1% NCO groups. In order to render the product more suitable for the manufacture of cellular polyurethanes, 0.27% ionisable chlorine may be introduced into 87 parts of the product by dissolving therein 3.8 parts of diisocyanatodiarylmethane mixture containing 7.2% dissolved hydrogen chloride. The liquid product shows absorption in the infra red at 5.85 and 7.05 microns characteristic of the triaryl substituted isocyanurate ring, in addition to absorption at 4.35 microns due to the isocyanate group.

Example 9

102 parts of distilled diisocyanatodiarylmethane mixture made as described in Example 4 are stirred with 0.44 part of a solution of lead 2-ethylhexoate in white spirit (lead content 25.0%) at 55° C. for 5 hours. 4.7 parts of diisocyanatodiarylmethane mixture containing 7.2% dissolved hydrogen chloride are added to the warm solution which is filtered after a short time from catalyst residues. The liquid product contains 27.2% NCO groups and 0.32% ionisable chlorine and its infra-red absorption characteristics to those of

Example 10

38.7 parts of a liquid diisocyanatodiarylmethane, prepared as described in Example 2 are stirred at 85° C. and 3.35 parts of trimethylolpropane are added during 1½ hours; after stirring for a further 3 hours, the product is filtered at about 70° C. The filtrate has an NCO-content of 22.8%.

Example 11

To 50 parts of the well-stirred liquid diisocyanatodiarylmethane prepared as described in Example 2 5.2 parts of trimethylolpropane are added during 1 hour at 85° C. and stirring is continued at 85° C. a further 2 hours. 18.4 parts of ethyl acetate are added and the product is filtered. The filtrate has an NCO content of 15.8%.

Example 12

52 parts of a liquid diisocyanatodiarylmethane, made as described in Example 4 are stirred at 85° C. while 5.5 parts of commercial hexanetriol (rich in 1:3:5-hexanetriol) are added during 1½ hours. After stirring for a further 1½ hours the product is filtered at about 75° C. from a little suspended matter. The cold filtrate is a syrupy liquid containing 21.7% NCO groups.

Alternatively, the liquid diisocyanatodiarylmethane mixture is dissolved in 19.2 parts ethyl acetate and the reaction conducted at 77±1° C. The resulting clear solution contains 16.3% NCO groups.

Example 13

2.25 parts commercial hexane triol are added during 1¼ hours to a solution of 21.2 parts of the liquid 4:4′-diisocyanato-3-methyldiphenylmethane, prepared as described in Example 5, in 7.8 parts ethyl acetate stirred with exclusion of moisture at 78±1° C. After heating for a further 1½ hours at this temperature, the cold reaction product forms a clear solution containing 15.7% NCO groups.

Alternatively, the reaction may be conducted in the absence of solvent and the reaction product filtered hot to remove suspended particles of gel. The resulting viscous liquid is dissolved in sufficient methyl ethyl ketone to give a 75% solution containing 16.4% NCO groups.

Example 14

10 parts trimethylolpropane are added during 1¼ hours to 190 parts of a liquid diisocyanatodiarylmethane prepared as in Example 3 and stirred at 85° C. under a nitrogen atmosphere. After stirring at 85° C. for a further 2 hours, the product is filtered at 60° C. from a little suspended matter. The mobile liquid product contains 26.3% NCO groups.

Example 15

A solution of 78.0 parts of a liquid diisocyanatodiarylmethane, prepared as described in Example 4, in 31.4 parts methyl ethyl ketone, is stirred at 78±1° C. with exclusion of moisture while a mixture of 6.4 parts diethylene glycol and 10.0 parts commercial hexane triol is added over 1½ hours. After heating under these conditions for a further 2 hours, the cold reaction product forms a syrupy liquid containing 9.8% NCO groups.

Example 16

A solution of 52.0 parts of a liquid diisocyanatodiarylmethane, prepared as described in Example 4, in 19.0 parts methylethyl ketone is stirred at 78±1° C. while 5.0 parts triethanolamine are added over 1½ hours. After heating under these conditions for a further 2 hours, the cold reaction product is filtered from a little suspended matter to give a mobile deep straw-coloured liquid containing 15.95% NCO groups.

Example 17

51.8 parts castor oil dehydrated by heating to 120° C. at 15 mm. pressure are added over 1½ hours to 78.0 parts of a liquid diisocyanatodiarylmethane, prepared as described in Example 4, stirred at 70° C. The temperature is then raised to 80° C. for 2 hours. The cold viscous liquid product contains 12.9% NCO groups and is soluble in ethyl acetate.

Example 18

A solution of 11.5 parts of the dried polyester from glycerol (4 mols.) and adipic acid (3 mols.) (total hydroxyl and acid value, 487 mg. KOH per gm.) in 10 parts methyl ethyl ketone is added over 1½ hours to a stirred solution of 52.0 parts of a liquid diisocyanatodiarylmethane, prepared as described in Example 4, in 11.2 parts methyl ethyl ketone maintained at 78±1° C. The reaction product is diluted with 42.4 parts methyl ethyl ketone and stirred a further 2 hours at 78±1° C. It is filtered when cold from suspended particles of gel to give a clear solution containing 9.1% NCO groups.

Example 19

To a solution of 78.0 parts of a liquid diisocyanato-diarylmethane, prepared as described in Example 4, in 26.0 parts methyl ethyl ketone stirred at 77–79° C., a solution in 13.7 parts methyl ethyl ketone of 41.2 parts of the polyester from ethylene glycol (0.90 mol.), glycerol (0.34 mol.) and adipic acid (1.0 mol.) of hydroxyl content 6.2% is added over 1½ hours. After 2 hours stirring at 78° C., the cold reaction product is diluted with 39.7 parts methyl ethyl ketone and filtered after 24 hours from suspended insoluble matter. The clear filtrate contains 8.8% NCO groups.

The products of Examples 10 to 19 inclusive form clear films at normal temperatures, with polyesters containing free hydroxyl groups, in contrast to the cloudy films formed from the unmodified liquid diisocyanates.

What I claim is:

1. An ethyl acetate-soluble interaction product of (a) the liquid polyisocyanate composition obtained by phosgenating a polyamine composition obtained by condensing one molecular proportion of formaldehyde with at least four molecular proportions of a mixture of at least two aromatic amines selected from the group consisting of o- and m-alkylaniline, o- and m-chloroanilines, o- and m-anisidines, o- and m-nitroanilines, m-phenyl diamine, m-toluylene diamine and chloro-m-phenylene diamine, said mixture containing amounts of said amines sufficient that said polyamine will contain not more than 80% of any single aromatic amine with (b) an amount sufficient to provide 0.05 to 0.5 isocyanate-reactive group per isocyanate group of said liquid polyisocyanate of at least one organic compound selected from the group consisting of hexane triols, triethanolamine, diethylene glycol, butylene glycols, diethanol amine, N-methyldiethanol amine, castor oil and polyesters formed by condensation of a polyhydric alcohol and a polycarboxylic acid.

2. The process which comprises heating together (a) the liquid polyisocyanate composition obtained by phosgenating a polyamine composition obtained by condensing one molecular proportion of formaldehyde with at least four molecular proportions of a mixture of at least two aromatic amines selected from the group consisting of o- and m-alkylaniline, o- and m-chloroanilines, o- and m-anisidines, o- and m-nitroanilines, m-phenyl diamine, m-toluylene diamine and chloro-m-phenylene diamine, said mixture containing amounts of said amines sufficient that said polyamine will contain not more than 80% of any single aromatic amine with (b) an amount sufficient to provide 0.05 to 0.5 isocyanate-reactive group per isocyanate group of said liquid polyisocyanate of at least one organic compound selected from the group consisting of hexane triols, triethanolamine, diethylene glycol, butylene glycols, diethanol amine, N-methyldiethanol amine, castor oil and polyesters formed by condensation of a polyhydric alcohol and a polycarboxylic acid.

3. Interaction products of the liquid polyisocyanate compositions as claimed in claim 1 wherein the compound containing a plurality of isocyanate reactive groups is trimethylolpropane.

4. Interaction products of the liquid polyisocyanate compositions as claimed in claim 1 wherein the proporreactive groups used is such as to provide 0.2 to 0.3 isocyanate-reactive group per isocyanate group.

5. An interaction product according to claim 1 wherein said polyamine composition is obtained by condensing 4 to 5 molecular proportions of the amine mixture per molecular proportion of formaldehyde.

References Cited in the file of this patent

UNITED STATES PATENTS

| 2,683,730 | Seeger et al. | July 13, 1954 |
| 2,827,665 | Rogers et al. | Mar. 25, 1958 |

FOREIGN PATENTS

| 742,501 | Great Britain | Dec. 30, 1955 |